United States Patent [19]

Moore

[11] Patent Number: 4,467,599
[45] Date of Patent: Aug. 28, 1984

[54] TURBORAN SPEED LIMITING CONTROL SYSTEM

[75] Inventor: M. Samuel Moore, Northridge, Calif.

[73] Assignee: Semco Instruments, Inc., North Hollywood, Calif.

[21] Appl. No.: 334,552

[22] Filed: Dec. 28, 1981

[51] Int. Cl.³ .......................... F02C 7/047; F02C 9/28
[52] U.S. Cl. .............................. 60/39.093; 60/39.281; 60/226.1
[58] Field of Search .............. 60/39.093, 39.281, 226.1

[56] References Cited

U.S. PATENT DOCUMENTS

| | | | |
|---|---|---|---|
| 4,206,597 | 6/1980 | Larsen et al. | 60/226.1 |
| 4,242,864 | 1/1981 | Cornett et al. | 60/226.1 |
| 4,258,545 | 3/1981 | Slater | 60/226.1 |

*Primary Examiner*—Louis J. Casaregola
*Attorney, Agent, or Firm*—Poms, Smith, Lande & Rose

[57] ABSTRACT

The maximum speed of a turbofan engine varies in accordance with moderately complex relationships involving the temperature, the pressure or altitude, and whether or not the subordinate systems such as the anti-ice systems are operative. The maximum allowable rotational speed for the fan section of a turbofan engine increases with increased altitude or reduced pressure, and normally increases as the ambient temperature increases up to speeds limited by the centrifugal and other forces acting on the turbine blades. However, there is a maximum fan rotational speed above which the engine should not be operated, and there is a limit which decreases with increasing temperature above which the fan should not be operated regardless of the pressure. In addition, when the anti-ice or other subordinate systems are operative, these limits are reduced substantially. The present invention involves the electronic determination of the normal linear relationship of fan speed with temperature at a fixed pressure or at a series of fixed pressures, a determination of the maximum fan speed limit for each temperature, in terms of a function having a negative slope with increasing pressure, an electronic circuit arrangement for shifting from one characteristic to the other to avoid damage to the turbofan engine by running it at above-specification rotational speed; and also includes switching arrangements for changing operational limits upon operation of the de-icing or similar equipment.

13 Claims, 7 Drawing Figures

TURBOFAN SPEED LIMITING CONTROL SYSTEM

FIELD OF THE INVENTION

The present invention relates to automatic speed control arrangements for turbine engines.

BACKGROUND OF THE INVENTION

Aircraft turbofan engines involve a structure wherein a large fan toward the front of the engine supplies most of the thrust for the aircraft; and the air from the fan is directed through a shell-like passageway which extends around the engine. Some portion of the input air passing through the fan is directed to the inner turbine section where fuel is burned, with the expanding gases driving a power generating turbine section. The input fan is driven through gearing and central drive shaft arrangements from the power turbine section. Assuming a constant pressure at sea level, for example, then the maximum permissible fan speed is a linear function of temperature, with a positive slope. In this connection, as the temperature increases, the air thins out and its density and oxygen content decreases. Accordingly, the maximum permissible fan rotational speed increases. Similarly, at a given temperature, at higher altitudes or lower pressure, the air is thinner, and a similar increase in the maximum permissible fan speed occurs. Another factor which comes into play is the maximum permissible speed for the fan, regardless of the physical conditions such as pressure and temperature. Also, above a certain temperature, such as 10 or 15 degrees below zero centigrade, the maximum permissible fan speed starts to decrease, with increasing temperature. This additional characteristic, therefore, has a negative slope. As one further complicating factor, when subsidiary systems such as the anti-ice equipments are turned on, this has the effect of further limiting and reducing the maximum fan speed permissible with increasing temperature.

These maximum fan speed limitations are included in instructions for pilots to be followed in the operation of the aircraft, but they are so complex as to be very demanding of the pilot's attention, and distract the pilot from other flight control matters to which his attention should be directed.

Accordingly, a principal object of the present invention is to develop an electronic system which will automatically take into consideration all of the various characteristics discussed hereinabove, which will automatically shift from the positive speed versus temperature characteristics with constant pressure, over to the negative sloped maximum speeds versus temperature characteristics, and also automatically shift from one characteristic to another when the anti-ice systems are switched on and off. In addition, this system will provide an automatic maximum limitation of fan speed regardless of pressure and temperature conditions.

SUMMARY OF THE INVENTION

In accordance with the present invention, a turbofan engine control system includes a temperature sensor, a pressure sensor, and a tachometer input coupled from the turbofan engine to indicate the fan rotational speed. Voltages are developed from the temperature and pressure inputs, as well as from the tachometer input, and these are amplified. A maximum speed limitation is provided which prevents the fan speed from exceeding the highest permissible speed, regardless of temperature and pressure conditions. Arrangements are provided for determining normal operating conditions involving a substantially linear increase in permissible fan rotational speed with increasing temperature, at a fixed pressure; and shifting this characteristic to higher values, as the pressure decreases for the altitude increases. Additionally, a maximum velocity for each temperature is established, with this fan speed versus temperature characteristic having a negative slope. Then for the particular temperature and pressure conditions which are encountered, a composite maximum permissible fan speed is developed, which is the lower of the maximum speed permitted for the particular temperature, or the linear positive sloped fan speed versus temperature characteristics for the pressure which is present. Finally, depending on whether the anti-ice equipment is operative or not, a different negatively sloped maximum fan rotational speed characteristic which decreases with increasing temperature, is selected. The maximum permissible fan speed calculated as discussed hereinabove is then compared with the actual speed of the turbofan engine as sensed by the tachometer, and if the actual speed is in excess of that permitted for the temperature and pressure conditions which are present, a proportional fuel control solenoid valve is actuated to reduce fuel flow to the engine, thereby reducing the fan speed so that it is not beyond the proper level.

From another aspect, the system includes pressure and temperature bus inputs, and resistance networks, as well as multiplier circuits to implement the function:

$$E = A(H + BT)^2 + CH + DT + F$$

where E is a voltage representing the maximum allowable fan speed, H represents height or altitude, T represents temperature, and A, B, C, D and F represent constants.

In accordance with additional features of the invention, the squared term may be implemented by combining resistance network outputs through the multiplier circuits, and then summing with direct inputs from resistance networks; where the networks are energized from pressure and temperature input points or buses.

Further features of the invention involve (1) resistance network switching circuits for changing characteristics when the anti-ice equipment is energized; (2) a limiting network to process the summed output representing desired maximum fan speed, thereby providing an absolute maximum; and (3) "fail-safe" valve arrangements for disconnecting the system and restoring full throttle control to the pilot, when the fan speed limiting system is turned off.

Other objects, features and advantages of the invention will become apparent from a consideration of the following detailed description and from the accompanying drawings.

DETAILED DESCRIPTION

Figure 1:
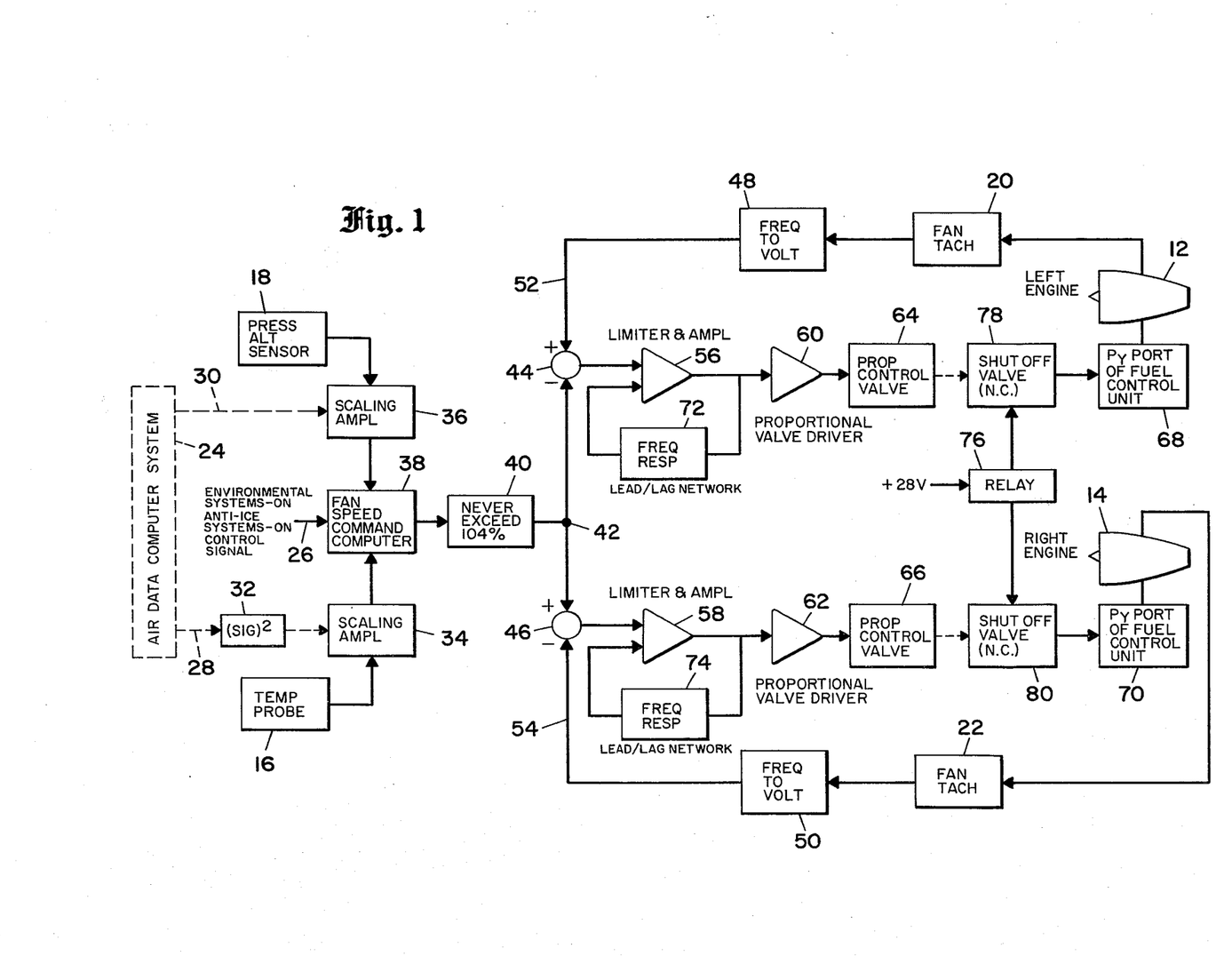
FIG. 1 is a block diagram illustrating the turbofan speed limiting control system of the present invention.

Referring more particularly to the drawings, FIG. 1 is a block circuit diagram showing arrangements for automatically limiting the speed of two turbofan engines 12 and 14 which are shown to the right in FIG. 1. Inputs to the system include the output from a temperature probe 16 and from a pressure sensor 18, as well as the fan tachometers 20 and 22 associated respectively with the left engine 12 and the right engine 14. Alternatively, instead of the temperature probe 16 and the pressure sensor 18, the same information may be available from an air data computer 24, and inputs from the air data computer may be employed in place of the direct inputs from the temperature probe 16 and the pressure sensor 18. The one additional input is from lead 26 which indicates whether the parasitic or subordinate equipment, such as the anti-ice systems, are on or off. Incidentally, the temperature signal from the air data computer appears at lead 28, and the pressure or altitude signal at lead 30. Because the air data computer signal is normally the square root of the temperature, the electronic squaring circuit 32 is provided so that the input to the temperature scaling amplifier 34 is the same both for the direct temperature probe input and also for the signal from the air data computer.

Figure 5A:
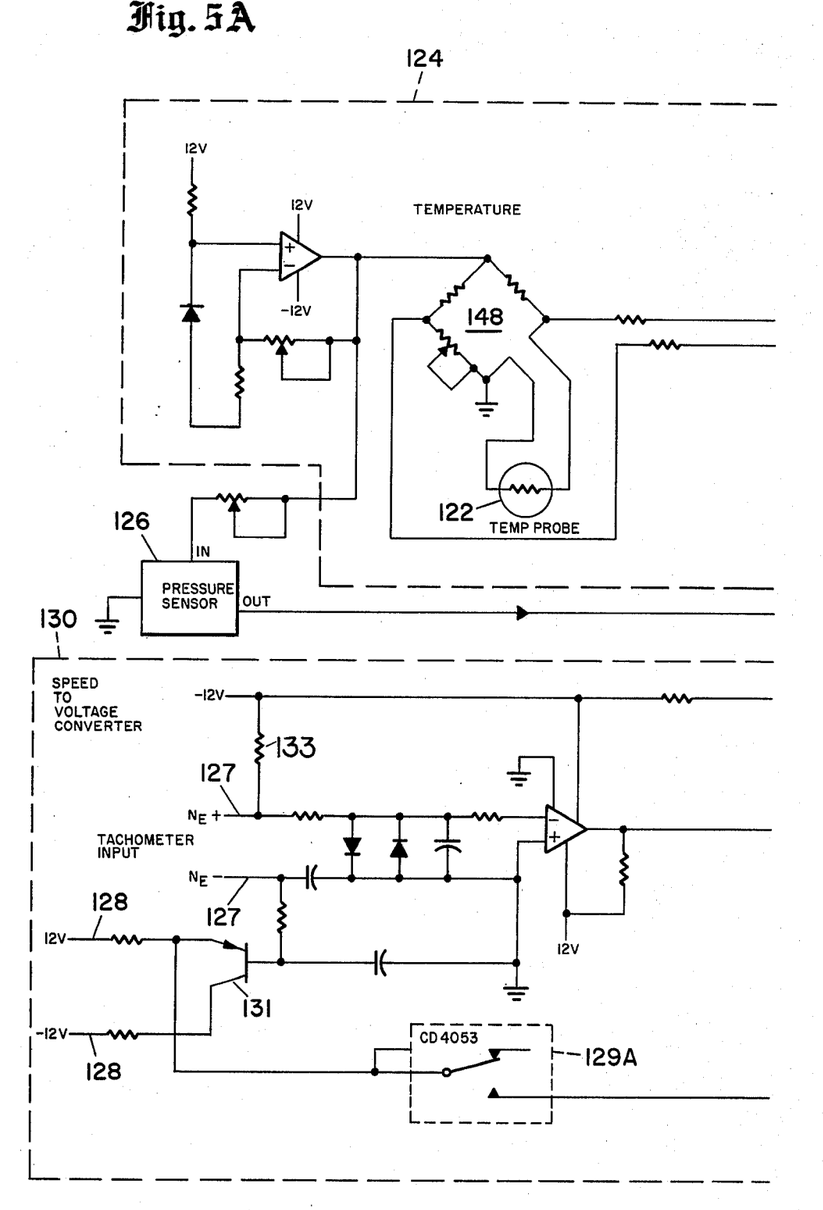
FIG. 5A, 5B and 5C are a schematic circuit diagram showing the implementation of the system shown in block diagram form in FIG. 1.
Figure 5B:
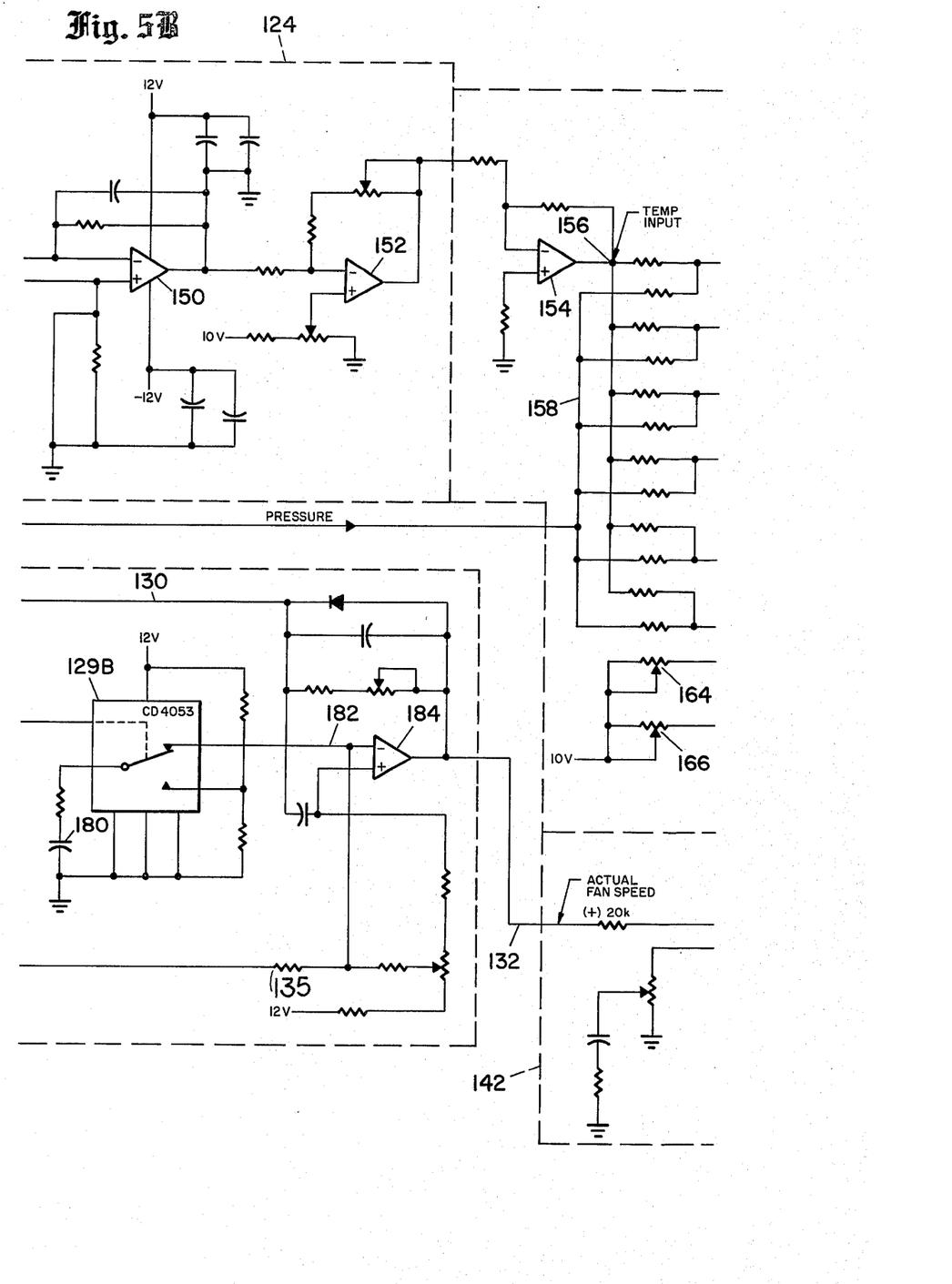
Figure 5C:
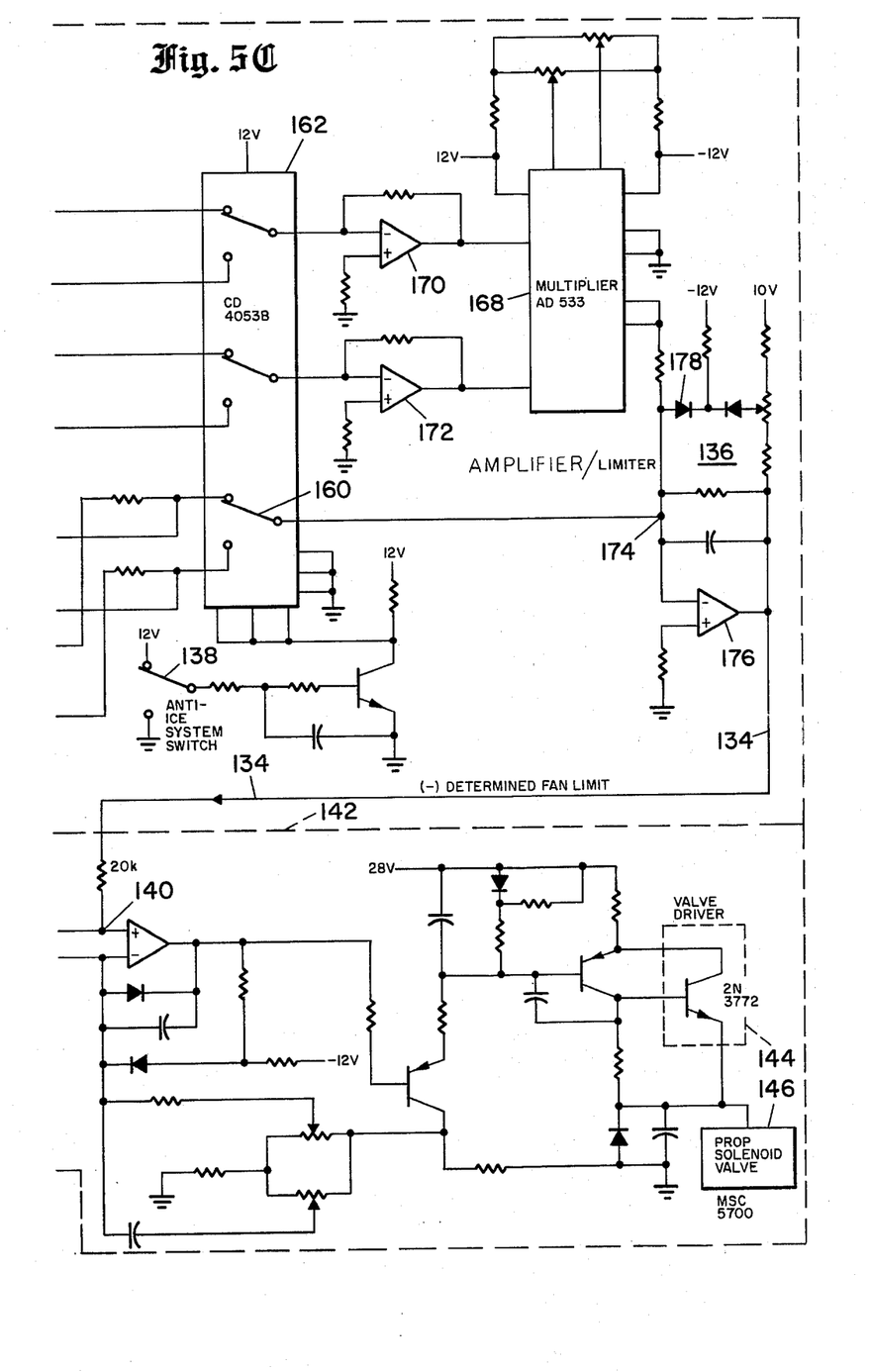

The scaling amplifier 36 for the pressure signal from sensor 18 appears at the input to the fan speed command computer 38 which is shown in some considerable detail in FIGS. 5A, 5B and 5C. A limiter 40 is designated "never exceed 104%" and prevents the rotational speed of the computer from exceeding 104% of the rated fan speed even at high elevations and warmer temperatures when maximum fan speed limits are desirable.

Accordingly, a signal is supplied to point 42 and to the summing junctions 44 and 46 indicating the maximum rotational speed for the fan in terms of a predetermined voltage level. The frequency-to-voltage converters 48 and 50 provide similarly scaled voltage signals on leads 52 and 54, respectively, indicating the actual rotational speed of the fans of the turbofan engines 12 and 14. In the event that the actual speed of rotation of one of the fans, as indicated on lead 52 or 54 exceeds the calculated maximum as indicated by the voltage supplied from point 42, an input signal is supplied to the operational amplifier 56 and/or 58 (as the case may be), the signal is amplified by the proportional valve driver amplifiers 60 and 62, and operate the proportional control valves 64 and 66, to bleed pressure from the fuel control units 68 and 70, thereby reducing the fuel flow to the engines 12 and 14, thus reducing the rotational speed of the fan section of the turbofan engines 12 and 14 to a level as calculated by the command computer 38 and the limiter 40.

Suitable lead/lag networks 72 and 74 avoid unduly fast response of the system, and the oscillation or hunting which might otherwise occur in the servo loop. When the computer system of the present invention is turned on, the relay 76 is operated, and the normally closed shut-off valves 78 and 80 are open, thereby permitting control to bleed off pressure by the proportional control valves 64 and 66. Accordingly, the arrangement is a "fail-safe" one, in which, when the system is turned off, the shut-off valves 78 and 80 positively disconnect the system from affecting the fuel control units 68 and 70, and full manual control of the throttles is restored to the pilot.

Figures 2, 3:
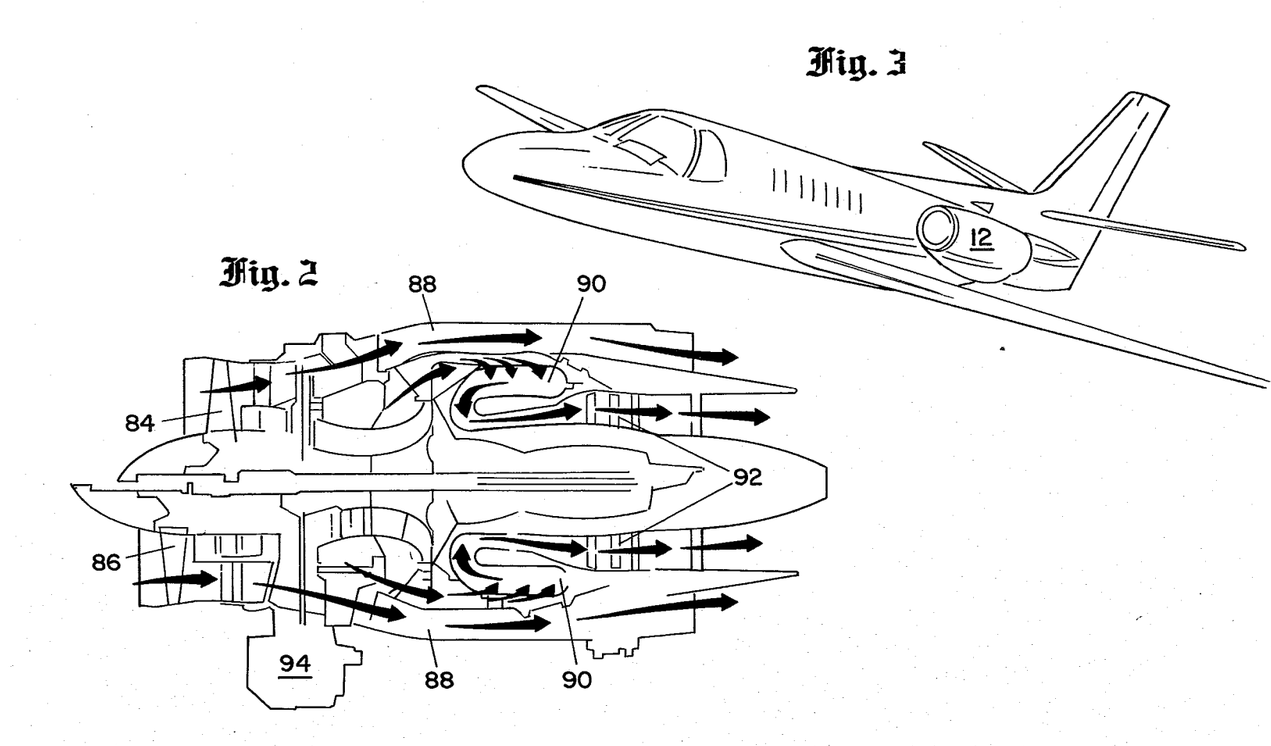
FIG. 2 is a schematic showing of a turbofan engine.
FIG. 3 shows a jet aircraft equipped with two turbofan engines.

Now, turning to FIGS. 2 and 3, the present invention is being illustrated in terms of the turbofan engine designated JT-15D made by the Pratt & Whitney Aircraft Company of Canada, and the Cessna Citation two engine aircraft. The Cessna Citation is pictured in FIG. 3, and the Pratt & Whitney JT-15D engine is shown schematically in FIG. 2. In FIG. 2, slightly different engine configurations are shown in the upper and the lower sections, with increased power being provided by the longer engine shown in the lower section of FIG. 2. In a turbofan engine of the type shown in FIG. 2, most of the thrust of the engine is provided by the fan, with the blades 84 and/or 86 being shown at the left-hand or front of the engine. A peripheral air passageway 88 receives the bulk of the thrust from the fan blades 84 and/or 86, and this supplies the main propulsion for the aircraft. An inner air passageway is of a re-entrant configuration with combustion taking place in the zone indicated by Reference Numeral 90 in FIG. 2. As the gases burn and expand, they follow the path indicated by the arrows, and drive the turbine blades 92. These turbine blades 92 are secured to a central drive shaft, and appropriate gearing which is not shown in detail in FIG. 2, which drives the fan blades 84 and/or 86. The fuel controller unit, which may for example be made by Bendix, is shown at Reference Numeral 94 in FIG. 2.

Figure 4:
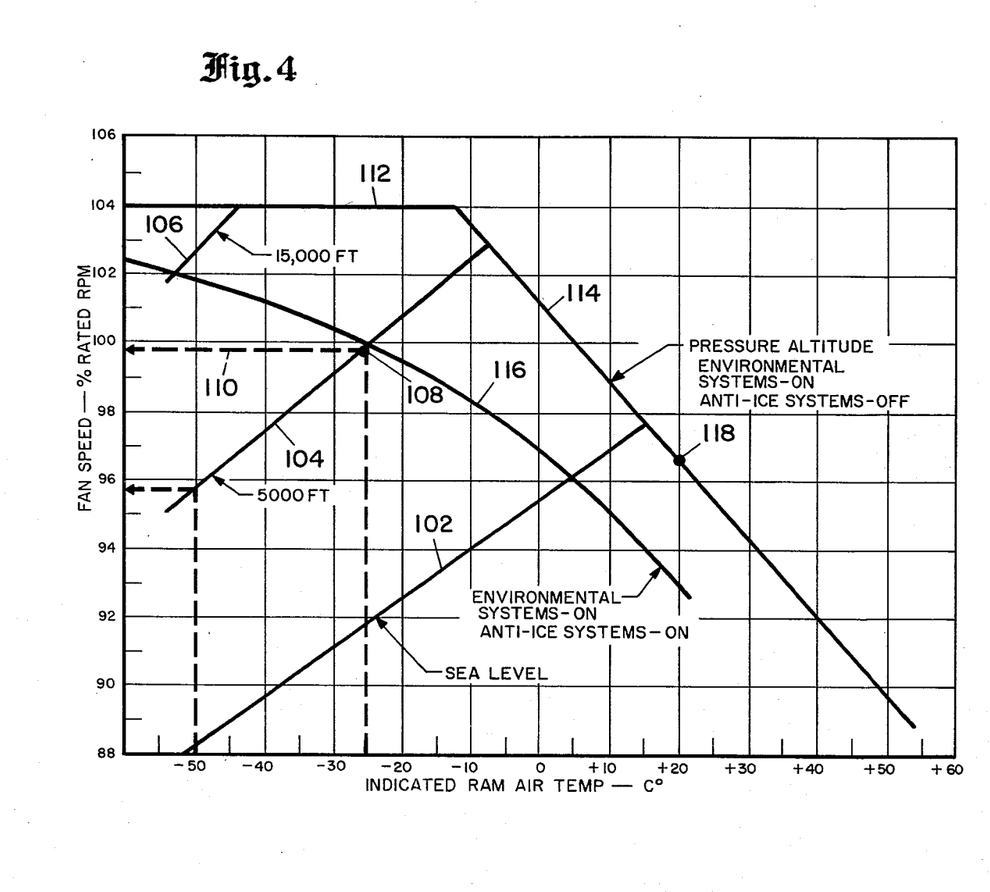
FIG. 4 is a plot showing the maximum permissible fan speed under various conditions of temperature and pressure.

Attention will now be directed to the plots of FIG. 4 which relate the rotational fan speed to the temperature, and altitude or pressure. At the left-hand side of FIG. 2 the fan speed is given in terms of percentage of the rated speed. For the purposes of FIG. 4, and in the case of the Cessna citation Two Aircraft using the Pratt & Whitney JT-15D engine, 100% corresponds to approximately 15,900 revolutions per minute. Along the bottom of FIG. 4 the input temperature to the engine is indicated in degrees centigrade, and ranges from minus 60 degrees centigrade up to plus 60 degrees centigrade, with zero degrees centigrade being the freezing temperature for water in the centigrade or Celsius system. With regard to the plots included in FIG. 4, it may be noted that the plot 102 relates maximum fan speed to air temperature at sea level, while the plots 104 and 106 provide similar characteristics for pressures or altitudes corresponding to 5,000 feet and 15,000 feet, respectively.

Now, reference is made to the point 108 corresponding to a temperature of minus 25 degrees C., and an altitude for the aircraft of 5,000 feet. As indicated by the intercept of the dashed line 110, the permissible maximum fan speed is approximately 99.8 percent, and this would be just under the 15,900 revolutions per minute corresponding to 100% for the particular case under consideration.

Now, in addition to the substantially linear characteristics provided by the plots 102, 104, and 106, for different elevations, there are certain maximum limits which come into play under specific circumstances, and these are represented by the limiting characteristics 112, 114, and 116. The horizontal line 112 indicates that the fan should never be operated at a rotational speed above 104%, and this corresponds for the particular case under consideration to a rotational speed of 16,536 RPM. The downwardly sloping characteristics 114 indicates a decreasing maximum limit, with increasing temperature. Thus, for example, the normal maximum speed at sea level, for take-off, for example, is given by the positively sloped characteristic 102. However, with a temperature of +20 degrees C., the intersection with the plot 114 is at point 118, giving an indicated maximum fan speed of 96.5 percent, instead of the limit which would be somewhat higher than 98% if the characteristic 102 were extended to its point of intersection with the plus 20 degree vertical line. Incidentally, the characteristic including the horizontal line 112 and the negatively sloped line 114 are operative when the anti-ice systems are off. However, when the anti-ice systems are turned on, thus drawing hot air from the engine, the maximum permissible speed limits are given by the characteristic 116, and the somewhat lower limits prevail. It may be noted in passing that the point 108 which was considered above very nearly represents the maximum permissible speed at 5,000 feet elevation, with the anti-ice systems on. It appears that the limit at 5,000 feet with the anti-ice systems on is actually 100%, rather than the 99.8% indicated by point 108.

Turning back to FIG. 1, it may be noted that the characteristic 112 is implemented by the limiter 40 in FIG. 1 which limits the maximum fan speed to 104%. Further, the input 26 to the circuit 38 determines whether the characteristic 116 or the combined characteristic 112, 114, is operative, depending on the state of the anti-ice equipment.

Consideration will now be given to FIGS. 5A, 5B, and 5C which together implement many of the blocks shown in FIG. 1, and the functions as discussed hereinabove in connection with FIG. 4. More specifically, referring to FIGS. 5A, 5B and 5C, the inputs to this circuit include the temperature probe 122 which appears within the dashed line block 124 on FIGS. 5A and 5B; the pressure sensor which appears at reference numeral 126 in FIG. 5A, and the tachometer input, which is essentially a sine wave, and which appears at input leads 127 within the dashed line block 130 extending from FIG. 5A to FIG. 5B. The actual fan speed appears as a voltage on lead 132, and the fan limit as determined by the fan speed computer circuitry appears on lead 134 in FIG. 5C. The limiter 136, see FIG. 5C, provides the "not over 104%" function indicated by the limiting line 112 in FIG. 4. The switch 138 (FIG. 5C) indicates whether the anti-ice systems are on or off and the switch is shown representing the state where the anti-ice systems are off.

At the summing point 140 included within the output circuit 142 in FIGS. 5B and 5C, the actual fan speed is compared with the determined fan speed limit, and if the actual fan speed is in excess of the determined fan limit, the valve driver 144 is energized to partially open the proportional solenoid valve 146 and bleed air from the fuel controller 94 (see FIG. 2) thereby reducing the fan speed down to the determined limit. If the speed is under limits no corrective action in required.

Now that the overall inputs and outputs to the circuit of FIGS. 5A, 5B and 5C have been indicated, the mode of operation of the indicated circuits will be explained to the next degree of depth. However, because the individual circuits are implemented by conventional electronics, every resistor capacitor and operational amplifier will not reviewed in detail. First, with regard to the temperature circuit 124, the temperature probe 122 is included in a Wheatstone bridge circuit 148, and the operational amplifiers 150, 152 and 154 develop a voltage at point 156 which varies in accordance with the changes and resistance of the temperature probe 122. At minus 54 degrees C., the voltage at point 156 is zero or ground, and at plus 50 degrees C., the voltage at point 156 is 8 volts. On lead 158, the pressure sensor supplies a voltage which ranges from approximately minus 7.37 volts representing sea level altitude or pressure, to 0 volts or ground, representing a vacuum, or space.

It has been determined that the characteristics of FIG. 4 with the exception of the line 112, may be represented by the following equation:

$$E = A(H + BT)^2 + CH + DT + F \qquad (1)$$

where E is the desired control voltage, H represents the altitude, or height, T represents the temperature, and the letters A, B, C, D and F represent constants.

The terms "CH" and "DT" are implemented by the resistors extending from the temperature input point or bus 156 and the pressure input bus 158, to the switch 160 which is controlled by the state of the anti-ice system switch 138. With the two positions of the switch 160, the linear pressure and temperature terms may be shifted from one set of values to another by the different input resistance networks which are employed. Similarly, the off-set term F, is selectively provided by the potentiometer 164 or 166. The multiplier 168 together with the operational amplifiers 170 and 172 and the weighted temperature and pressure inputs, provide the squared term of Equation 1, as set forth hereinabove. With the foregoing arrangements, the voltage at the summing point or lead 174 could exceed a value representing 104% of rated speed. However, the limiter 136 is provided to limit the voltage to −8.3 volts at the output of the operational amplifier 176, with the input point 174 being coupled to the negative input of the operational amplifier. Accordingly, if the output from amplifier 176 on lead 134 starts to reach a more negative value than −8.3 volts (representing 104% of rated fan speed), the diode 178 will start to conduct, and the voltage will be held to that level.

Concerning the speed-to-voltage converter circuit included in block 130 in FIGS. 5A and 5B, the tachometer input is a substantial sine wave, and operates the switch 129-B (chip CD4053) which appears as two different blocks in FIGS. 5A and 5B, respectively. Transistor 131, powered from leads 128, senses the transducer continuity from the current and through resistor 133 drives switch 129-A to provide an arbitrary safe speed simulation through resistor 135. The operation of switch 129-B causes the charging and discharging of capacitor 180, and increments of charge are supplied on lead 182 to the operational amplifier 184, and these are proportional to the frequency of the tachometer input, which is in turn proportional to the speed of rotation of the fan of the turbofan engine. With this arrangement, the voltage on lead 132 will range from 0 to +8 volts from 0 to 100% of rated speed. Accordingly, as mentioned above, the valve driver 144 is only energized when the actual fan speed voltage on lead 132 exceeds the determined fan limit on lead 134 at the summing point 140. As noted above, the actual detailed implementation of the various amplifiers, and switching circuits is generally conventional, and there is accordingly no need to go into all of these details.

Now, considering the plots of FIG. 4 and how they are implemented by the circuit of FIGS. 5A, 5B and 5C, it may again be noted that the maximum allowable fan speed increases with increasing temperature at lower temperature levels as indicated by the plots 102, 104 and 106. In addition, the maximum allowable fan speed increases with increasing altitude, as indicated by the higher fan speeds permitted at the increased altitudes of 5,000 feet and 15,000 feet, as compared with the maximum allowable fan speeds at sea level. Accordingly, the maximum allowable fan speed is a positive function of temperature at lower temperature levels, and this is implemented by the resistive network connected by switch 160 to point 174, and the associated input resistance connecting switch 160 to the temperature input point 156. Similarly, the positive relationship between fan speed and pressure is implemented by the pressure inputs through resistors to the switch 160 and eventually to the point 174. The limitations with increased temperature as indicated by the characteristics 114 and 116 are implemented by the multiplier 168 and the operational amplifiers 170 and 172 and their inputs. As the temperature increases, the negative temperature term becomes more pronounced, and controls the overall function. Of course, the absolute limit of not exceeding 104% of rated speed, is implemented by the limiter 136 in FIG. 5C which operates on the output from the provisional maximum calculation from the multiplier 168 and from switch 160 as added at point 174. In addition, of course, the values of the resistance associated with the lower terminals of each of the three switches included in the solid switch 162, determines the negative sloped fan speed versus temperature characteristic 116 which comes into play when the de-icing equipment is turned on.

In conclusion, it is to be understood that the foregoing description and drawings are merely illustrative of one embodiment of the invention. Other arrangements for accomplishing the functions described hereinabove may be implemented by those skilled in the art. Thus, for example, other types of limiters, switches, amplifiers, multipliers and the like could be employed in the circuit of FIGS. 5A, 5B and 5C, without departing from the scope of the present invention. Also, the form of Equation 1 is representative of one particular turbofan engine, and other engine types would have differing but similar functional equations; and the analog circuits employed in the implementation of certain functions could be accomplished by digital logic and computing circuitry following appropriate analog to digital conversion for the analog inputs, and pulse to binary conversion for the tachometer input. Accordingly, the present invention is not limited to the arrangements precisely as shown and described hereinabove.

What is claimed is:

1. An aircraft turbofan engine speed control system for limiting the maximum speed of a turbofan engine having associated anti-ice equipment, wherein the maximum permissible speed for the turbofan engine is a function of temperature, pressure and of the operating state of the anti-ice equipment, said system comprising:

means for sensing the air pressure in the vicinity of the turbofan engine;

means for sensing the temperature in the vicinity of the turbofan engine;

means for measuring the speed of rotation of the fan section of said engine;

means for providing an output signal indicating whether the anti-ice equipment is in operation;

circuit means for determining a maximum allowable fan speed which increases with increasing temperature at lower temperature ranges; means for increasing the maximum allowable fan speed with increasing altitude and reduced pressure; means for reducing the maximum allowable fan speed with increasing temperature at higher temperature levels; and means for limiting the allowable fan speed to a predetermined maximum absolute limit, regardless of temperature and pressure; to thereby determine a composite maximum allowable fan speed;

means for providing an alternative composite maximum allowable fan speed depending on whether said anti-ice equipment is in operation or not;

switching means for selecting one of said two composite maximum allowable fan speeds depending on the state of operation of the anti-ice equipment; and means for comparing the actual turbine fan speed with the selected composite maximum allowable fan speed and for limiting the actual speed to the vicinity of said selected maximum allowable speed.

2. A system as defined in claim 1 further comprising proportional solenoid valve means for reducing fuel flow to the engine, and means for energizing said valve whenever the actual fan speed is greater than the selected maximum fan speed.

3. A system as defined in claim 1 including electronic multiplier circuitry for implementing the determination of the maximum allowable fan rotational speed.

4. A system as defined in claim 1 further including means for converting variable frequency signals from an engine tachometer into variable voltage signals representing the engine fan speed of rotation.

5. A system as defined in claim 1 wherein electronic circuit means are provided to implement the function:

$$E = A(H+BT)^2 + CH + DT + F$$

where E represents the desired voltage representing maximum fan rotational speed, H represents altitude or height, T represents temperature, and A, B, C, D and F are constants, said electronic circuit including a plurality of resistive networks, means for energizing said resistive networks by signals representing temperature and pressure, at least one multiplier circuit receiving inputs from said resistive networks, and means for summing the output from said multiplier circuit with signals taken directly from said resistive networks.

6. A system as defined in claim 5 further including switching means for switching from one set of operative resistance networks to another set of resistance networks when the anti-ice equipment is turned off or on.

7. A system as defined in claim 5 wherein said system includes an electronic limiting circuit means for receiving and limiting the summed output from said multiplier circuit and from said resistive networks.

8. An aircraft turbofan engine speed control system for limiting the maximum speed of a turbofan engine wherein the maximum permissible speed for the turbofan engine is a function of temperature and pressure, said system comprising:

means for sensing the air pressure in the vicinity of the turbofan engine;

means for sensing the temperature in the vicinity of the turbofan engine;

means for measuring the speed of rotation of the fan section of said engine;

circuit means for determining a maximum allowable fan speed which increases with increasing temperature at lower temperature ranges; means for increasing the maximum allowable fan speed with increasing altitude and reduced pressure; means for reducing the maximum allowable fan speed with increasing temperature at higher temperature levels; and means for limiting the allowable fan speed to a predetermined maximum absolute limit, regardless of temperature and pressure; to thereby determine a composite maximum allowable fan speed;

means for comparing the actual turbine fan speed with the determined composite maximum allowable fan speed and for limiting the actual speed to the vicinity of said determined maximum allowable speed.

9. A system as defined in claim 8 further comprising proportional solenoid valve means for reducing fuel flow to the engine, and means for energizing said valve whenever the actual fan speed is greater than the selected maximum fan speed.

10. A system as defined in claim 9 further comprising fail-safe means for disabling said solenoid valve upon de-energization of the system.

11. A system as defined in claim 8 including electronic multiplier circuitry for implementing the determination of the maximum allowable fan rotational speed.

12. A system as defined in claim 8 wherein electronic circuit means are provided to implement the function:

$$E = A(H+BT)^2 + CH + DT + F$$

where E represents the desired voltage representing maximum fan rotational speed, H represents altitude or height, T represents temperature, and A, B, C, D and F are constants, said electronic circuit including a plurality of resistive networks energized by signals representing temperature and pressure, at least one multiplier circuit receiving inputs from said resistive networks, and means for summing the output from said multiplier circuit with signals taken directly from said resistive networks.

13. An aircraft turbofan engine speed control system for limiting the maximum speed of a turbofan engine having an associated anti-ice equipment, wherein the maximum permissible speed for the turbofan engine is a function of temperature, pressure and of the operating state of the anti-ice equipment, said system comprising:

means for sensing the air pressure in the vicinity of the turbofan engine;

means for sensing the temperature in the vicinity of the turbofan engine;

means for measuring the speed of rotation of the fan section of said engine;

means for providing an output signal indicating whether the anti-ice equipment is in operation;

means for establishing a first function of the maximum fan speed of said turbofan engine in accordance with a substantially linear function of the temperature for each predetermined pressure level, means for establishing a second function of the maximum fan speed for each temperature in accordance with a function having a negative slope, means for providing an alternative second temperature dependent function depending on whether said anti-ice equipment is in operation or not, and means for selecting the lesser maximum fan speed as established by each of said first and the operative one of said second functions to provide a composite calculated maximum fan speed; and means for comparing the actual turbine fan speed with the determined composite maximum allowable fan speed and for limiting the actual speed to the vicinity of said determined maximum allowable speed.

* * * * *